United States Patent
Yokoyama

(10) Patent No.: US 7,094,984 B2
(45) Date of Patent: Aug. 22, 2006

(54) KEY SWITCH AND KEYBOARD INPUT DEVICE USING THE SAME

(75) Inventor: Kazuhiro Yokoyama, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/122,971

(22) Filed: May 5, 2005

(65) Prior Publication Data

US 2005/0260023 A1    Nov. 24, 2005

(30) Foreign Application Priority Data

May 17, 2004    (JP)    ............... 2004-146132

(51) Int. Cl.
*H01H 13/00*    (2006.01)

(52) U.S. Cl. ........................................... 200/344
(58) Field of Classification Search ............ 200/5 A, 200/517, 341, 344, 345; 400/490, 491, 491.2, 400/495, 495.1, 496; 341/22; 345/168, 345/169
See application file for complete search history.

(56) References Cited

U.S. PATENT DOCUMENTS

| | | | | |
|---|---|---|---|---|
| 5,669,723 A | * | 9/1997 | Chang | 200/344 |
| 6,011,227 A | * | 1/2000 | Yoneyama | 200/344 |
| 6,100,482 A | * | 8/2000 | Koma et al. | 200/344 |
| 6,107,584 A | * | 8/2000 | Yoneyama | 200/344 |
| 6,597,344 B1 | * | 7/2003 | Narusawa et al. | 200/344 |
| 6,657,139 B1 | * | 12/2003 | Hasunuma | 200/5 A |
| 6,689,977 B1 | * | 2/2004 | Ito et al. | 200/344 |
| 6,723,935 B1 | * | 4/2004 | Watanabe | 200/344 |

FOREIGN PATENT DOCUMENTS

JP    A1 3067837    1/2000

* cited by examiner

*Primary Examiner*—Michael A. Friedhofer
(74) *Attorney, Agent, or Firm*—Brinks Hofer Gilson & Lione

(57) ABSTRACT

A key top of a key switch is formed so as to extend in a horizontal direction, not in a vertical direction. On a rear surface of the key top, a reinforcing member that horizontally extends is mounted on one end portion in the vertical direction and a torsion bar that horizontally extends is rotatably supported on the other end portion in the vertical direction. When the key top is pressed against a biasing force of an elastic member, the reinforcing member prevents the key top from deforming.

14 Claims, 3 Drawing Sheets

KEY SWITCH AND KEYBOARD INPUT DEVICE USING THE SAME

BACKGROUND OF THE INVENTION

This application claims the benefit of priority to Japanese Patent Application No. 2004-146132, filed on May 17, 2004, herein incorporated by reference.

1. Field of the Invention

The present invention relates to a key switch and a keyboard input device using the same and, particularly, to a key switch which can go up and down while a key top is supported in a horizontal state, and a keyboard input device using the key switch.

2. Description of the Related Art

In Japanese Registered Utility Model No. 3067387, a conventional key switch is disclosed, which will now be described with reference to FIGS. 6 and 7. In the key switch, an uppermost key top 50 is formed so as to horizontally extend, like a space key and so on. At a center of a rear surface of the key top 50, a projection 53 is formed. Referring to FIG. 6, on the right side of the projection 53, a first supporting groove 51 and a second supporting groove 52 outside the first supporting groove 51 are formed.

Further, in FIG. 6, on the left side of the projection 53, a slide groove 54 is formed so as to face the first supporting groove 51 with the projection 53 interposed therebetween.

Further, a slide shaft 71a which is formed at an upper end portion of a first lever 71 is slidably engaged with the slide groove 54. A rotational shaft 72a which is formed at an upper end portion of a second lever 72 is rotatably engaged with the first supporting groove 51.

The first and second levers 71 and 72 are supported by a supporting member 73 provided substantially at their central portions to be linked together in an X shape. A rotational shaft 80a which is formed at an upper end portion of a torsion bar 80 is engaged with and supported by the second supporting groove 52. The torsion bar 80 is formed by bending a metal bar.

A slide shaft 71b which is formed at a lower end portion of the first lever 71 is slidably supported by a slide groove 61 formed on a base plate 60.

A rotational shaft 72b which is formed at a lower end portion of the second lever 72 is rotatably supported by a supporting member 62 formed on the base plate 60.

Further, outside the supporting member 62 on the base plate 60, a rotational supporting member 64 is formed so as to rotatably support a curved portion 80b formed at a lower end portion of the torsion bar 80. The rotational supporting portion 64 is provided with a hole therein through which the curved portion 80b of the torsion bar 80 is inserted.

Further, a hollow elastic member 66 is press-fitted and mounted on the projection 53 of the key top 50.

On the base plate 60, a sheet member 65 provided with a membrane switch (not shown) formed therein on a portion where the elastic member 66 is disposed is provided. In this case, if the key top 50 is pressed downward, the elastically deformed elastic member 66 presses on the sheet member 65. Then, the membrane switch is operated, such that a switch circuit is switched.

However, in the above-described conventional key switch, the key top 50 is reduced in thickness so as to reduce the thickness of the key switch. Thus, when the key top 50 is formed so as to horizontally extend, like a shift key or a space key, if a corner portion of the key top 50 in a horizontal direction is pressed, deformation such as torsion occurs in the key top 50.

In particular, when the corner portion of the key top 50 disposed at an opposite side to a portion which supports the rotational shaft 80a of the torsion bar 80 shown in FIG. 7 is pressed, deformation such as torsion is caused by a biasing force of the elastic member 66. Then, the key top 50 is inclined, which makes it difficult to perform a normal switch operation.

SUMMARY OF THE INVENTION

The invention has been made to solve the above-described problems, and it is an object of the invention to provide a key switch in which a key top can go down while being supported in a horizontal state, even if the key top horizontally extends, thereby performing a normal switch operation, and a keyboard input device using the key switch.

In order to solve the above-described problems, according to a first aspect of the invention, a key switch includes a pair of lever members, a key top that is elevatably supported by the pair of lever members, and an elastic member that elastically biases the key top upward. The key top has a reinforcing member that, when the key top is pressed against a biasing force of the elastic member, prevents the key top from deforming.

Further, it is preferable that the key top is formed so as to extend in a horizontal direction, not in a vertical direction. In this case, on a rear surface of the key top, the reinforcing member that extends in the horizontal direction may be mounted on one end portion in the vertical direction and a torsion bar that extends in the horizontal direction may be rotatably mounted on the other end portion in the vertical direction.

Further, it is preferable that the reinforcing member is made of a metal plate and has a rectangular cross-sectional shape in which a length in a widthwise direction of the plate is larger than a length in a thicknesswise direction of the plate. In this case, the reinforcing member may be mounted on the key top such that the width direction of the reinforcing member is orthogonal to the rear surface of the key top.

Further, it is preferable that, on a rear surface of the key top, an outer circumferential wall that surrounds an outer circumferential portion is provided and a supporting member that supports an upper end portion of one of the lever members is provided. In this case, the reinforcing member may be interposed between the outer circumferential wall and the supporting member to be supported.

Further, it is preferable that a retaining portion that retains the reinforcing member interposed between the outer circumferential wall and the supporting portion is provided on the outer circumferential wall of the key top.

Further, it is preferable that the reinforcing member has a horizontally long portion and bent portions that are formed by bending both end portions of the long portion so as to face each other. In this case, the long portion and the bent portions may be mounted on a rear surface of the key top.

According to a second aspect of the invention, a keyboard input device includes the above-described key switch, and a base plate on which the elastic member and the pair of lever members are placed. In this case, the reinforcing member is mounted on the key top, and the key top is elevatably supported by the pair of lever members. Further, portions of the base plate may be cut and bent, and lower end portions of the pair of lever members are supported by the cut portions.

DESCRIPTION OF THE PREFERRED EMBODIMENT

Figure 1:
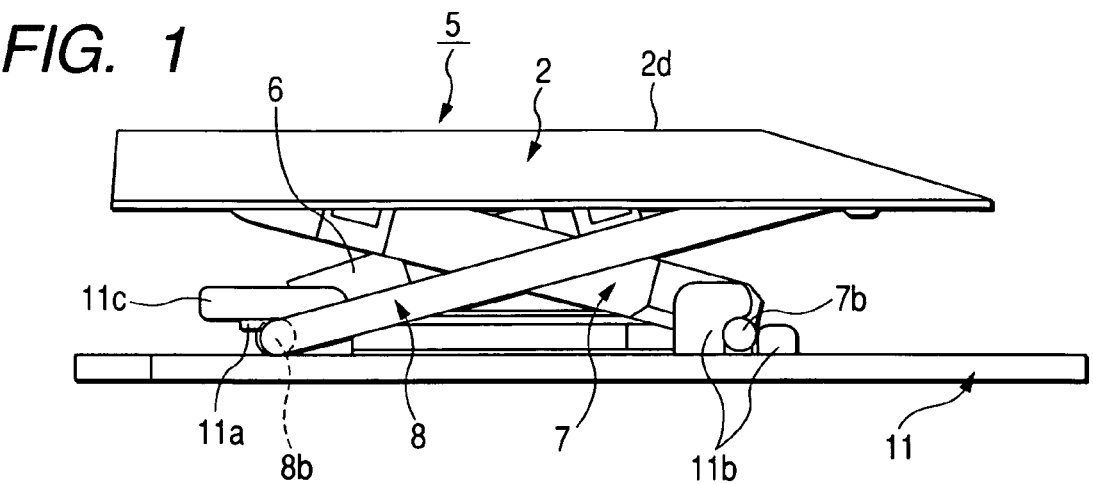
FIG. 1 is a front view of a key switch according to an embodiment of the invention.
Figure 2:
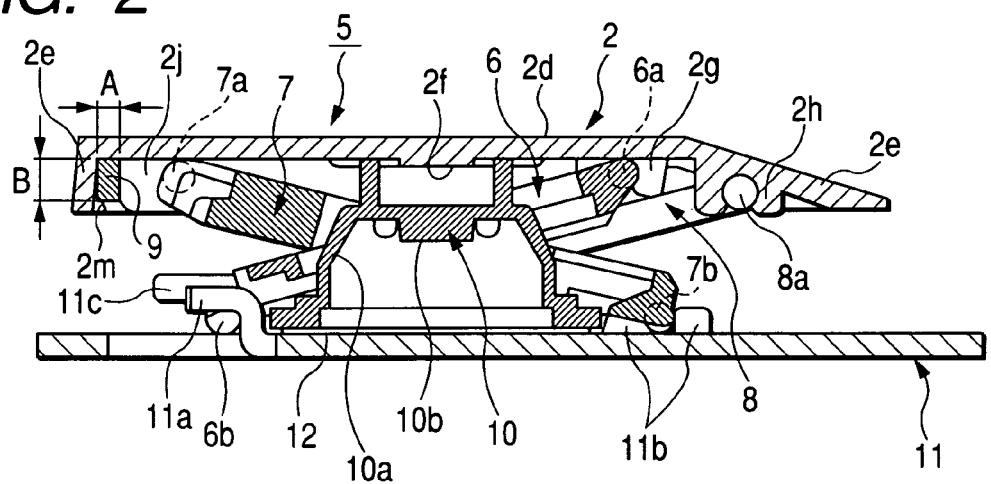
FIG. 2 is a cross-sectional view showing essential parts of the key switch of FIG. 1.
Figure 3:
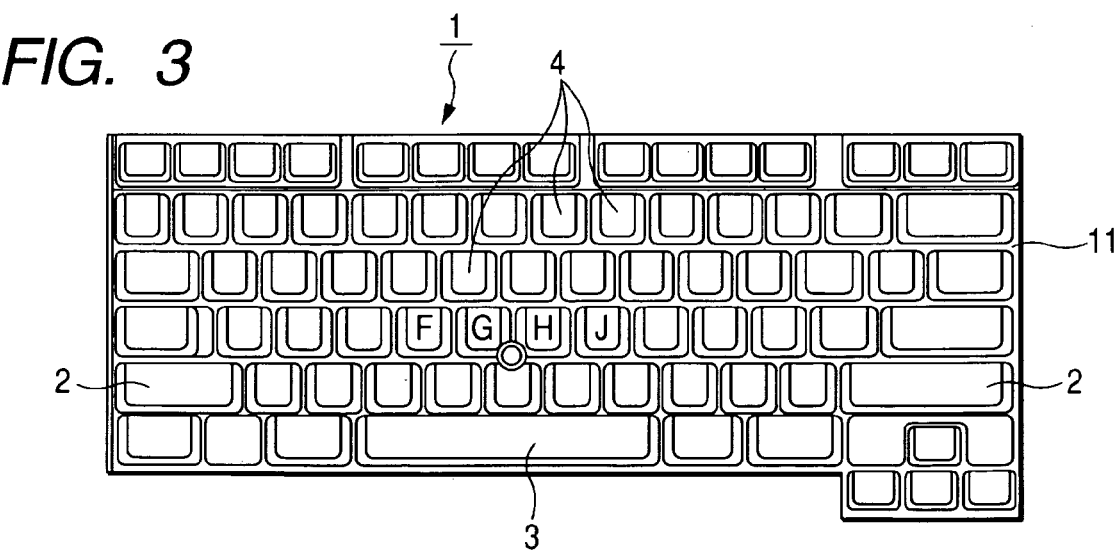
FIG. 3 is a plan view of a keyboard input device according to the embodiment of the invention.
Figure 4:
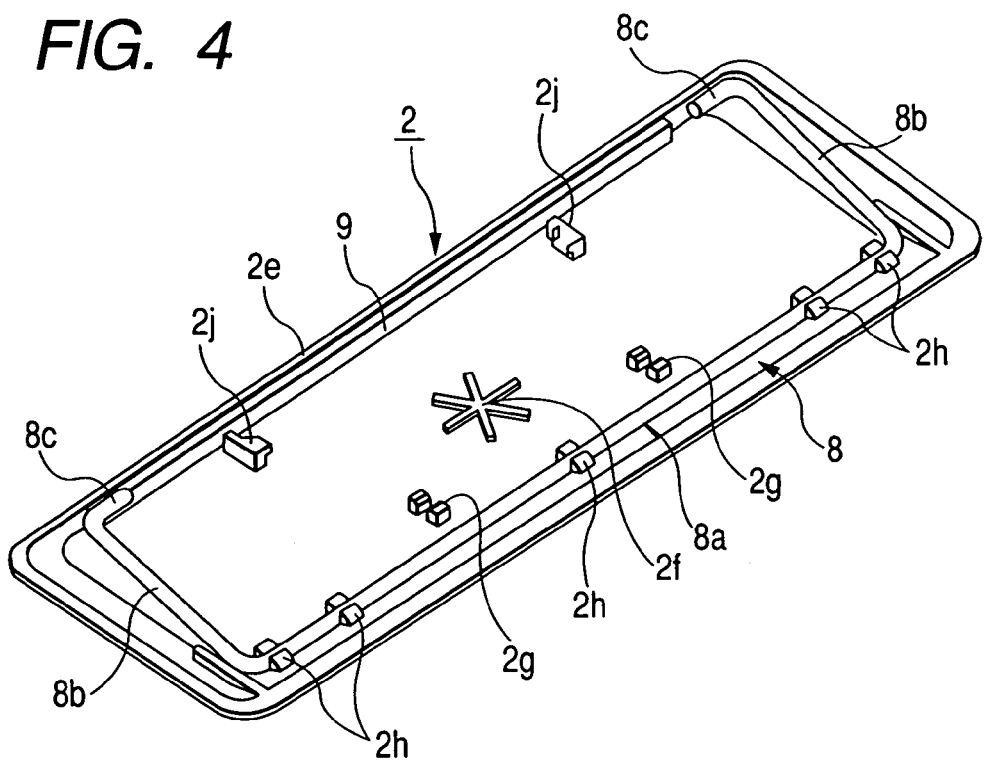
FIG. 4 is a bottom perspective view illustrating a key top according the embodiment of the invention.
Figure 5:
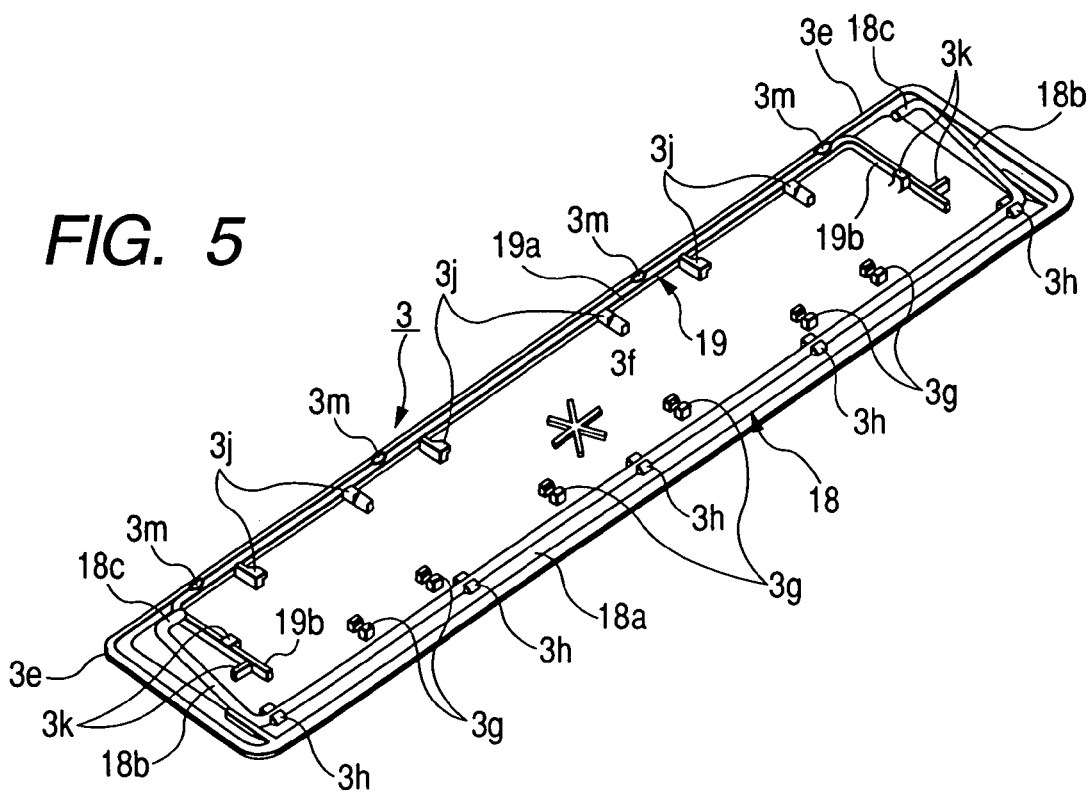
FIG. 5 is a bottom perspective view of a key top according to a modification of the invention.
Figure 6:
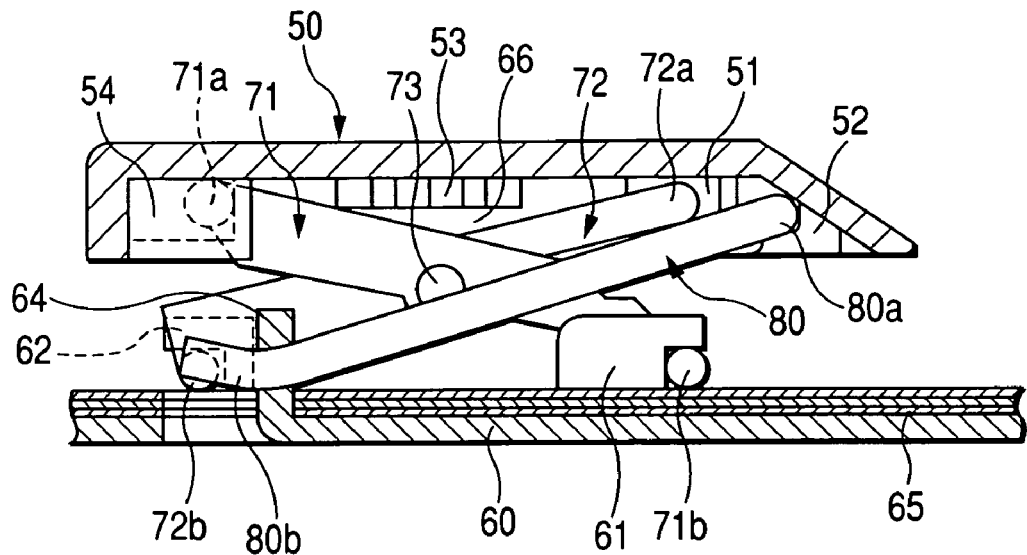
FIG. 6 is a cross-sectional view of essential parts of a key switch according to a prior art.
Figure 7:
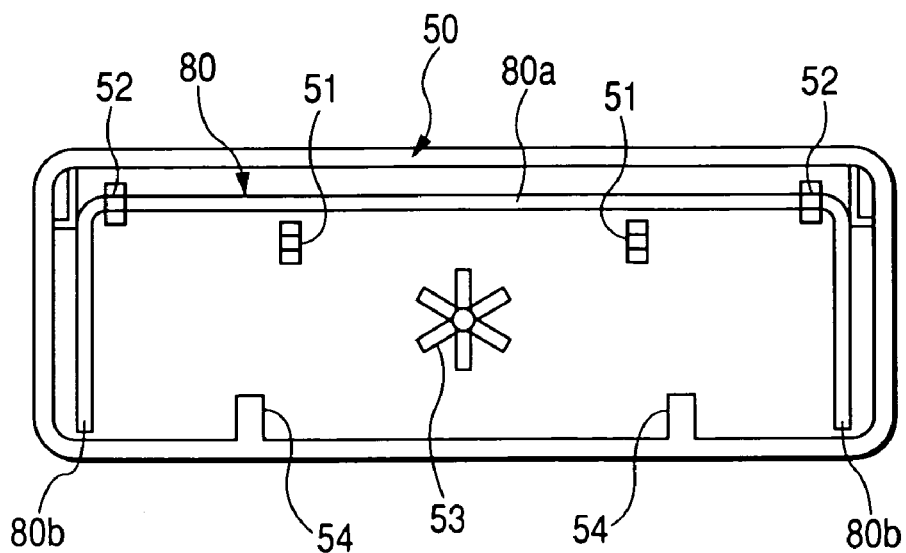
FIG. 7 is a bottom view of a key top used in the key switch according to the prior art.

Now, a key switch according to an embodiment of the invention and a keyboard input device using the same will be described with reference to the drawings. FIG. 1 is a front view of a key switch according to the embodiment of the invention. FIG. 2 is a cross-sectional view of essential parts of the key switch of FIG. 1. FIG. 3 is a plan view of a keyboard input device of the embodiment of the invention. FIG. 4 is a bottom perspective view illustrating a key top according to the embodiment of the invention. FIG. 5 is a bottom perspective view of a key top according to a modification of the invention.

As shown in FIG. 3, in a keyboard input device 1, key tops of the key switch according to the embodiment of the invention, including, horizontally extended key tops 2, such as a shift key and the like, a horizontally extended key top 3, such as a space key and the like, and substantially square key tops 4, such as character input keys, are arranged on a base plate 11, which will be described later.

Now, the key switch of the invention will be described by way of the key tops 2 including the shift key and the like. As shown in FIG. 4, the key top 2 extends in a horizontal direction, that is, a front-and-rear direction, not in a vertical direction, that is, a right-and-left direction.

A key switch 5 of an embodiment of the invention, such as the shift key and the like, which uses the horizontally extended key top 2 will be described with reference to FIGS. 1 and 2. The key top 2 has an operating surface, on which an operator can press, on a surface thereof (an upper surface of the key top 2 in FIG. 1 or 2). An outer circumferential portion of a rear surface of the key top 2 is surrounded by an outer circumferential wall 2e having predetermined height and thickness.

Referring to FIGS. 1 and 2, the outer circumferential wall 2e on a right side is formed in a slightly oblique shape and the outer circumferential wall 2e on a left side is substantially formed in a perpendicular shape.

Further, in FIGS. 1 and 2, on the rear surface of the key top 2, a spring fixing portion 2f is projected from a central portion and a rotational supporting portion 2g is formed on the right side of the spring fixing portion 2f. In addition, a bar supporting portion 2h is formed on the right side of the rotational supporting portion 2g.

Further, on the rear surface of the key top 2, a slide supporting portion 2j is formed on the left side of the spring fixing portion 2f.

Further, the key top 2 is elevatably supported by a pair of lever members, a first lever member 6 and a second lever member 7, which are linked together in an X shape. A rotational shaft 6a formed on an upper end portion of the first lever member 6 is rotatably engaged with and is supported by the rotational supporting portion 2g. A slide shaft 7a which is formed on an upper end portion of the second lever member 7 is slidably engaged with and is supported by the slide supporting portion 2j.

Further, a slide shaft 6b which is formed on a lower end portion of the first lever member 6 is slidably engaged with and is supported by a slide supporting portion 11a. The slide supporting portion 11a is formed by bending the base plate 4. A rotational shaft 7b which is formed on a lower end portion of the second lever member 7 is rotatably engaged with and is supported by a rotational supporting portion 11b. The rotational supporting portion 11b is formed by bending a base plate 11 which will be described later.

Further, on the rear surface of the key top 2, a torsion bar 8 is provided outside the first and second levers 6 and 7, as shown in FIG. 4. The torsion bar 8 is formed by bending a metal bar having a predetermined diameter.

The torsion bar 8 has a horizontally extended rotational shaft 8a, parallel extended portions 8b which are formed by bending both ends of the rotational shaft 8a in a vertical direction so as to face each other, and slide shafts 8c which are formed by bending front ends of the extended portions 8b inwardly so as to face each other. The rotational shaft 8a of the torsion bar 8 is rotatably snapped into and supported by the bar supporting portion 2h of the key top 2.

Further, as shown in FIG. 1, the slide shafts 8c of the torsion bar 8 are slidably engaged with a slide supporting portion 11c which is formed by bending the base plate 11. The base plate 11 will be described later.

Further, as shown in FIG. 2, a horizontally extended reinforcing member 9 is mounted along the outer circumferential wall 2e between the slide supporting portion 2j, which supports the slide shaft 7a of the second lever member 7, and the outer circumferential wall 2e on the left side.

Specifically, on the rear surface of the key top 2, as shown in FIG. 4, the reinforcing member 9 is mounted on one end portion in the vertical direction (the left side) and the rotational shaft 8a of the horizontally extended torsion bar 8 is supported at the other end portion in the vertical direction (the right side) which faces the reinforcing member 9.

The reinforcing member 9 is made of a metal plate such as iron and the like and has a rectangular cross-sectional shape in which a length B in a widthwise direction of the plate is larger than a length A in a thicknesswise direction of the plate. The reinforcing member 9 is mounted on the key top 2 such that the width direction of the reinforcing member 9 is perpendicular to the rear surface of the key top 2.

Further, as shown in FIG. 2, the reinforcing member 9 interposed between the outer circumferential wall 2e and the slide supporting portion 2j is retained by a retaining portion 2m. The retaining portion 2m is formed on the outer circumferential wall 2e.

In such a manner, the key top 2 is strengthened by the rotational shaft 8a of the torsion bar 8 and the reinforcing member 9. Therefore, even though a corner on an outer circumferential edge of the key top 2 is pressed, the key top 2 can be allowed to go down in a horizontal state by a biasing force of an elastic member 10. The elastic member 10 will be described later.

Further, the elastic member 10, which is an elastically deformable member, such as rubber, is supported by the spring fixing portion 2f of the key top 2. The elastic member 10 is provided with a dome-shaped hollow portion 10a therein. A bottom portion of the hollow portion 10a is fixed to a sheet member 12 provided on the base plate 11 by an adhesive.

The base plate 11 is made of a metal plate. Portions of the base plate 11 are cut and bent, and, by the cut portions, the slide supporting portions 11a and 11c and the rotational supporting portion 11b are formed.

Further, on the sheet member 12, a membrane switch (not shown) is formed by laminating a plurality of film members. In this case, when the key top 2 is pressed, the elastic member 10 elastically deforms. Then, a ceiling portion 10b of the hollow portion 10a presses on the membrane switch, such that a switch circuit is switched.

In such a manner, in the key switch 5 of the embodiment of the invention, the one end portion in the vertical direction of the key top 2 is strengthened by the reinforcing member 9 and the other end portion in the vertical direction is strengthened by the rotational shaft 8a of the torsion bar 8. For this reason, even though the corner portion of the key top 2 is pressed, the key top 2 goes down in the horizontal state. As a result, deformation such as torsion does not occur in the key top 2.

The operation of the key switch of the embodiment of the invention which has the key top 2 with the reinforcing member 9 mounted thereon as described above will be described. If an operator presses on the operating surface 2d of the key top 2 with a finger, the key top 2 goes down in the horizontal state by the action of the torsion bar 8. Accordingly, the elastic member 10 elastically deforms.

If the key top 2 is further pressed against the biasing force of the elastic member 10, the elastic member 10 further elastically deforms and is inverted. Since the elastic member 10 is flipped, a click feeling is gained. At the same time, the ceiling portion 10b of the hollow portion 10a presses on the membrane switch, which enables the switch circuit to be switched. As a result, a desired input can be performed.

Then, when the pressure applied to the key top 2 is removed, with the elastic force of the elastic member 10, the key top 2 automatically returns to the original state before the key top 2 is pressed.

Next, another embodiment of the invention will be described by way of a key switch which uses the key top 3, such as the space key. The key top 3 further extends in a horizontal direction, as compared to the key top 2 such as the shift key. The key top 3 has an outer circumferential wall 3e and a spring fixing portion 3f that supports the elastic member 10.

Further, the key top 3 which further extends horizontally, as compared to the key top 2, is supported, for example, by three sets of the first and second lever members 6 and 7. A plurality of rotational supporting portions 3g are formed so as to support the rotational shafts 6a on the upper end portions of the three first lever members 6. A plurality of slide supporting portions 3j are formed so as to support the slide shafts 7a on the upper end portions of the three second lever members 7.

Further, referring to FIG. 5, on the rear surface of the key top 3, a reinforcing member 19 mounted on one end portion on the left side and a torsion bar 18 is mounted on the other end portion on the right side.

The reinforcing member 19 has a horizontally long portion 19a and bent portions 19b which are formed by bending both ends of the long portion 19a so as to face to each other.

Referring to FIG. 5, the long portion 19a of the reinforcing member 19 is interposed between the outer circumferential wall 3e, which is formed on the one end portion (the left side) on the rear surface of the key top 3 and the plurality of slide supporting portions 3j. The bent portions 19b are supported by supporting projections 3k and 3k which are formed to be different from each other.

Further, the long portion 19a interposed between the outer circumferential wall 3e and the slide supporting portions 3j is retained by a retaining portion 3m which is formed on the outer circumferential wall 3e.

In such a manner, the key top 3 used in the key switch according to another embodiment is vertically, as well as horizontally, supported by the bent portions 19b of the reinforcing member 19. Therefore, even though the key top 3 further extend in the horizontal direction, as compared to the key top 2, the key top 3 can be allowed to go down in the horizontal state by the biasing force of the elastic member 10. As a result, a reliable switch operation can be performed.

In the keyboard input device 1 which uses the key switch of the invention, as shown in FIG. 3, the key tops 2, such as the shift key and the like, the key top 3, such as the space key and the like, and the plurality of key tops 4, such as the character input keys, are arranged on the large base plate 11.

The portions of the base plate 11 are cut and bent, and the lower end portions of the first and the second lever members 6 and 7 are supported by the cut portions. Accordingly, the plurality of key switches are supported on the base plate 11. As a result, a desired input can be performed by pressing a desired key top.

According to the invention, the reinforcing member is provided to prevent the key top from deforming when the key top is pressed against the biasing force of the elastic member. Thus, deformation such as torsion is prevented from occurring in the key top. As a result, a reliable switch operation can be performed.

Further, the key top is formed so as to extend in the horizontal direction, not in the vertical direction, and on the rear surface of the key top, the reinforcing member that horizontally extends is mounted on one end portion in the vertical direction and the torsion bar that horizontally extends is rotatably mounted on the other end portion in the vertical direction. As a result, the generation of deformation is further prevented by the reinforcing member and the torsion bar.

The reinforcing member is made of the metal plate and has the rectangular cross-sectional shape in which the length in the widthwise direction of the plate is larger than the length in the thicknesswise direction of the plate. Further, the reinforcing member is mounted on the key top such that the width direction of the reinforcing member is orthogonal to the rears surface of the key top. As a result, with the reinforcing member is mounted to the key top in the widthwise direction with high strength, the generation of deformation is further prevented.

Further, on the rear surface of the key top, the outer circumferential wall is formed so as to surround the outer circumferential portion and the supporting portion that supports the upper end portion of one of the pair of lever members is formed. In this case, the reinforcing member is interposed between the outer circumferential wall and the supporting portion to be supported. As a result, an assembling property can be enhanced.

On the circumferential wall of the key top, the retaining portion that retains the reinforcing member interposed between the outer circumferential wall and the supporting portion is formed. As a result, the reinforcing member can be retained, without using an adhesive. Further, the assembling property can be further enhanced.

Further, the reinforcing member has a horizontally long portion and bent portions which are formed by bending both end portions of the long portion so as to face each other. The long portion and the bent portions are mounted on the rear surface of the key top. As a result, even though the key top horizontally extends, deformation such as torsion is prevented from occurring due to the press operation.

Further, the keyboard input device of the invention includes a plurality of key switches described above, and a base plate on which the elastic member and the pair of lever members are placed. The reinforcing member is mounted on the key top and the key top is elevatably supported by the pair of lever members. The portions of the base plate are cut and bent, and lower ends of the pair of lever members are supported by the cut portions. Thus, even when the key top is pressed, the reinforcing member prevents deformation such as torsion from occurring in the key top. As a result, it is possible to provide a keyboard input device which can perform a reliable switch operation.

The invention claimed is:

1. A key switch comprising:
 a pair of lever members;
 a key top that is elevatably supported by the pair of lever members; and
 an elastic member that elastically biases the key top upward,
 wherein the key top has a reinforcing member that, when the key top is pressed against a biasing force of the elastic member, prevents the key top from deforming,
 the key top is formed so as to extend in a horizontal direction, not in a vertical direction, and
 on a rear surface of the key top, the reinforcing member that horizontally extends is mounted on one end portion in the vertical direction and a torsion bar that horizontally extends is rotatably supported on another end portion in the vertical direction.

2. The key switch according to claim 1,
 wherein the reinforcing member is made of a metal plate and has a rectangular cross-sectional shape in which a length in a width direction of the plate is larger than a length in a thickness direction of the plate, and
 the reinforcing member is mounted on a rear surface of the key top such that the width direction of the reinforcing member is orthogonal to the rear surface of the key top.

3. The key switch according to claim 1,
 wherein, on a rear surface of the key top, an outer circumferential wall is provided to surround an outer circumferential portion and a supporting portion that supports an upper end portion of one of the pair of lever members is provided, and
 the reinforcing member is interposed between the outer circumferential wall and the supporting portion.

4. The key switch according to claim 3, wherein, on the outer circumferential wall of the key top, a retaining portion that retains the reinforcing member interposed between the outer circumferential wall and the supporting portion is provided.

5. The key switch according to claim 1,
 wherein the reinforcing member has a horizontally long portion and bent portions which are formed by bending both ends of the long portion so as to face each other, and
 the long portion and the bent portions are mounted on the rear surface of the key top.

6. A keyboard input device comprising:
 the key switch according to claim 1; and
 a base plate on which the elastic member and the pair of lever members are placed,
 wherein the reinforcing member is mounted on the key top,
 the key top is elevatably supported by the pair of lever members, and
 portions of the base plate are cut and bent, and lower ends of the pair of lever members are supported by the cut portions.

7. A key switch comprising:
 a pair of lever members;
 a key top that is elevatably supported by the pair of lever members; and
 an elastic member that elastically biases the key top upward,
 wherein the key top has a reinforcing member that, when the key top is pressed against a biasing force of the elastic member, prevents the key top from deforming,
 the reinforcing member is made of a metal plate and has a rectangular cross-sectional shape in which a length in a width direction of the plate is larger than a length in a thickness direction of the plate, and
 the reinforcing member is mounted on a rear surface of the key top such that the width direction of the reinforcing member is orthogonal to the rear surface of the key top.

8. The key switch according to claim 7,
 wherein, on the rear surface of the key top, an outer circumferential wall is provided to surround an outer circumferential portion and a supporting portion that supports an upper end portion of one of the pair of lever members is provided, and
 the reinforcing member is interposed between the outer circumferential wall and the supporting portion.

9. The key switch according to claim 8, wherein, on the outer circumferential wall of the key top, a retaining portion that retains the reinforcing member interposed between the outer circumferential wall and the supporting portion is provided.

10. The key switch according to claim 7,
 wherein the reinforcing member has a horizontally long portion and bent portions which are formed by bending both ends of the long portion so as to face each other, and
 the long portion and the bent portions are mounted on the rear surface of the key top.

11. A key switch comprising:
 a pair of lever members;
 a key top that is elevatably supported by the pair of lever members; and
 an elastic member that elastically biases the key top upward,
 wherein the key top has a reinforcing member that, when the key top is pressed against a biasing force of the elastic member, prevents the key top from deforming,
 on a rear surface of the key top, an outer circumferential wall is provided to surround an outer circumferential portion and a supporting portion that supports an upper end portion of one of the pair of lever members is provided, and
 the reinforcing member is interposed between the outer circumferential wall and the supporting portion.

12. The key switch according to claim 11, wherein, on the outer circumferential wall of the key top, a retaining portion that retains the reinforcing member interposed between the outer circumferential wall and the supporting portion is provided.

13. The key switch according to claim 1,
wherein the reinforcing member has a horizontally long portion and bent portions which are formed by bending both ends of the long portion so as to face each other, and
the long portion and the bent portions are mounted on the rear surface of the key top.

14. A key switch comprising:
a pair of lever members;
a key top that is elevatably supported by the pair of lever members; and
an elastic member that elastically biases the key top upward,
wherein the key top has a reinforcing member that, when the key top is pressed against a biasing force of the elastic member, prevents the key top from deforming,
the reinforcing member has a horizontally long portion and bent portions which are formed by bending both ends of the long portion so as to face each other, and
the long portion and the bent portions are mounted on the rear surface of the key top.

* * * * *